Aug. 17, 1948.  W. R. JONES  2,447,184
BROILER COMPARTMENT
Filed July 25, 1944

INVENTOR.
William R. Jones
BY
ATTORNEYS

Patented Aug. 17, 1948

2,447,184

UNITED STATES PATENT OFFICE 2,447,184

BROILER COMPARTMENT

William R. Jones, Cleveland, Ohio

Application July 25, 1944, Serial No. 546,457

1 Claim. (Cl. 126—41)

This invention relates to cooking ranges, and has for its general purpose and object to provide the same with a novel assembly which will enable a broiler or similar food support to be conveniently applied to and removed therefrom and to be adjusted toward and from one or more heating elements thereabove; also to enable said assembly to receive and removably support thereon what is known to the trade as a deep well cooker and to enable the said cooker to be brought thereafter into operative relation to a heating element located therebelow.

Figure 1:
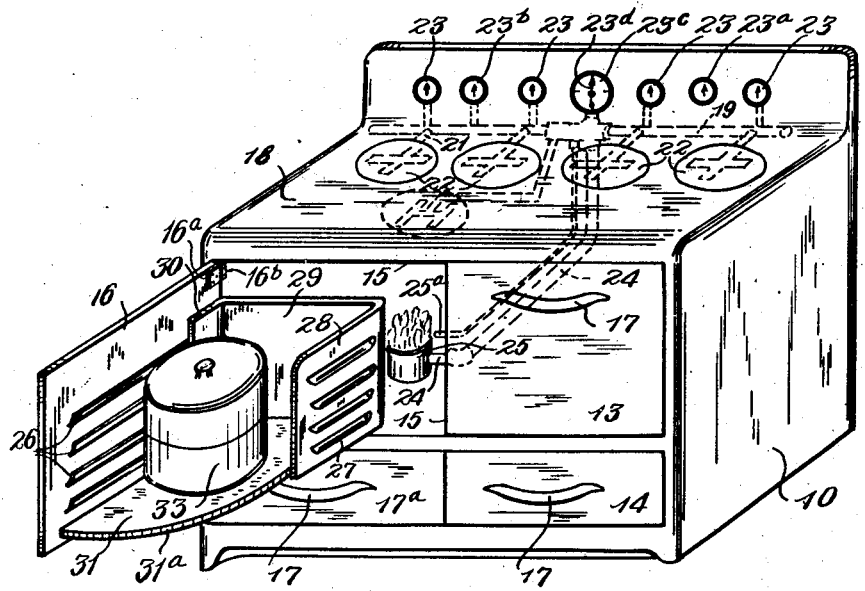
Figure 2:
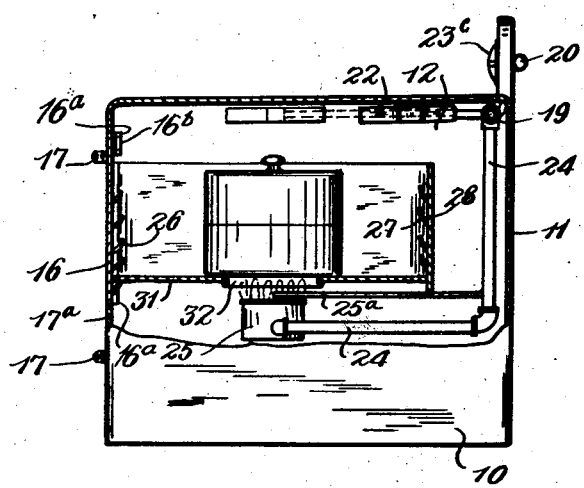

It is a further purpose and object of my invention to incorporate an assembly of the character described with the door of the compartment which utilizes the aforesaid heating elements. Further and more limited objects of my invention will be pointed out hereinafter in connection with the drawings hereof, wherein Fig. 1 represents a perspective elevational view of a cooking range showing my invention incorporated therewithin, the door to the cooking compartment being in open position and the deep well cooker being shown in place upon its supporting shelf; and Fig. 2 a side elevational view, with parts broken away, illustrating the manner in which the deep well cooker may be heated when the door of the heating compartment is closed.

Describing the parts herein by reference characters, 10 denotes one of the side walls, 11 the rear wall and 12 the opposite side wall of a cooking range, the front of the range being provided at one side with an oven having a door 13, a drawer beneath the said oven indicated at 14, a broiler compartment indicated at 15 and having a door 16 supported at one of its vertical edges by vertically spaced hinge members 16$^a$ connected to cooperating hinge members 16$^b$ on the front corner frame of the range. 17 denotes handles applied to the front of slidable compartments mounted within the body of the range, one of said compartments being a drawer 17$^a$ located beneath the cooking compartment.

The range shown herein is adapted for utilization of gas with the heating elements thereof and is shown as provided with a manifold 19 beneath the cooking top 18 and to which manifold gas is supplied from the gas line (not shown). The branches 21 from the manifold to the burners 22 are controlled by the usual valves 23, while valves 23$^a$ and 23$^b$ control the supply to the oven burners and broiler burners (not shown). 24 denotes a pipe which taps the manifold and which extends downwardly therefrom and communicates with a burner 25 located beneath the bottom shelf of the assembly by which the broiler and the deep well cooker are supported. A three-way valve 23$^c$ controls the supply of gas from the manifold to the pipe 24 and also the supply of gas from the manifold through a flash pilot tube 25$^a$. The valve 23$^c$ is of the ordinary type employed for this purpose and is adapted by a quarter rotation of the handle 23$^d$ thereof to the right to open the supply to the flash pilot tube; by an additional quarter rotation to the right to admit full supply of gas to the burner 25; and by a further quarter rotation to the right to reduce the supply to produce a "simmering" heat. A further quarter rotation in the right hand direction cuts off the supply through both pipes 24 and 25$^a$. The construction of this valve and the manner in which it controls the supply through pipes 25 and 25$^a$ are old and well known in the art and need no further illustration.

26 denotes a plurality of parallel horizontally extending supporting ribs projecting inwardly from the door 16 for engagement by one of the side edges of a broiler or similar food support and 27 denotes a plurality of cooperating ribs carried by one wall 28 of a U-shaped attachment, the said wall projecting from a base wall 29 which extends laterally from the portion of the door adjacent to the pivoted edge thereof, being secured thereto by means of a shorter wall 30 of the said attachment.

In ranges wherein deep well cookers are employed, it has been customary to provide the cooking tops of such ranges with deep wells for the reception of said cookers and to provide special heating elements for the same. This construction and arrangement necessarily deprives the cooking top of a heating element which could be used for general cooking purposes. By incorporating with the assembly comprising the oven door 16 and the walls 28, 29 and 30 an additional element which will now be described, I am able to utilize all of the burners with which a cooking top is equipped for general cooking purposes and at the same time avail myself of the use of these deep well cookers: 31 denotes a shelf which is removably supported upon the bottom ribs 26 and 27 with its inner end abutting against the base wall 29, the said shelf having an aperture 32 therein which is adapted to register with the top of the burner 25 when the door 16 is closed. In order to enable the door 16 to be closed, with the shelf and U-shaped attachment secured thereto, the side wall 28 is shortened sufficiently to clear the outer edge of the compartment 15 and the outer end of the shelf is rounded off, as shown at 31ª.

With the parts constructed and arranged as thus far described, the assembly comprising the door, the walls 28, 29 and 30 and the shelf 31 serve as a means for enabling a broiler to be mounted upon the ribs 26 and 27 at varying distances from the broiling burner or burners (not shown). When the assembly is used for broiling purposes, the burner 25 ordinarily will not be employed, but it will be employed when it is desirable to cook articles simultaneously on both sides thereof. In addition to the use of the assembly for broiling purposes, it also may be used as a means for conveniently applying a deep well cooker 33 to the shelf 31 thereof and above the opening 32, whereby the deep well cooker will be placed in operative relation to the burner 25 by the act of closing the door.

From the foregoing, it will be evident that I have provided an assembly for use with cooking ranges and by means of which the objects of my invention will be accomplished in a particularly effective manner and in a construction which is simple and inexpensive of production.

While my invention is shown herein as embodied in a cooking range wherein the heating elements are supplied with gas, it is equally applicable to ranges wherein the heating elements are of the electrical resistance type.

Having thus described my invention, what I claim is:

In a range having heating elements in the top thereof and a broiler compartment beneath one or more of the said heating elements and having a heating element in the upper portion thereof, a door for the said compartment, means pivotally supporting a vertical edge portion of said door, a wall secured to the inner side of the said door adjacent to the pivoted edge thereof and extending at substantially right angles from said door and a wall secured to the edge of the first mentioned wall which is remote from said door, the second mentioned wall extending substantially parallel with the door and being shorter than the said door, the said walls providing with the said door a U-shaped space, the said door and the wall parallel therewith being provided with means adapted to removably support a broiler thereupon and the said door and the wall parallel therewith being provided also with means adjacent to the lower ends thereof for removably supporting a shelf thereon, and a shelf removably supported upon said last mentioned means, the shelf being provided with an opening therethrough, and a secondary heating element within said compartment and above which the opening of said shelf is adapted to be positioned when the door is in its closed position.

WILLIAM R. JONES.

REFERENCES CITED

The following references are of record in the file of this patent:

UNITED STATES PATENTS

| Number | Name | Date |
| --- | --- | --- |
| 1,632,719 | White | June 14, 1927 |
| 1,938,470 | Teller et al. | Dec. 5, 1933 |
| 1,948,118 | Klemme | Feb. 20, 1934 |
| 2,027,124 | Stockstrom et al. | Jan. 7, 1936 |
| 2,296,140 | Brodbeck | Sept. 15, 1942 |